(12) United States Patent
Stevens

(10) Patent No.: US 7,864,366 B2
(45) Date of Patent: Jan. 4, 2011

(54) METHOD AND SYSTEM FOR IMPROVED SPACE FILLING INTERPOLATION

(75) Inventor: Michael T. Stevens, Aloha, OR (US)

(73) Assignee: Xerox Corporation, Norwalk, CT (US)

( * ) Notice: Subject to any disclaimer, the term of this patent is extended or adjusted under 35 U.S.C. 154(b) by 727 days.

(21) Appl. No.: 11/853,114

(22) Filed: Sep. 11, 2007

(65) Prior Publication Data

US 2009/0066978 A1 Mar. 12, 2009

(51) Int. Cl.
H04N 1/60 (2006.01)

(52) U.S. Cl. .................... 358/1.9; 358/518; 358/519; 358/520; 358/521; 358/522; 382/167; 382/168

(58) Field of Classification Search ............... 358/1.9, 358/3.23, 3.24, 518, 520; 382/162, 167, 382/254
See application file for complete search history.

(56) References Cited

U.S. PATENT DOCUMENTS

| | | | | |
|---|---|---|---|---|
| 5,483,360 | A * | 1/1996 | Rolleston et al. | 358/518 |
| 5,581,376 | A * | 12/1996 | Harrington | 358/518 |
| 6,204,939 | B1 * | 3/2001 | Lin et al. | 358/518 |
| 6,239,886 | B1 * | 5/2001 | Klassen et al. | 358/518 |
| 6,744,534 | B1 * | 6/2004 | Balasubramanian et al. | 358/1.9 |
| 6,987,588 | B2 | 1/2006 | Yao et al. | |
| 7,042,520 | B2 * | 5/2006 | Kim | 348/645 |
| 7,130,423 | B2 | 10/2006 | Stevens | |
| 7,158,686 | B2 * | 1/2007 | Gindele | 382/274 |
| 7,209,145 | B2 | 4/2007 | Stevens | |
| 7,215,440 | B2 | 5/2007 | Klassen et al. | |
| 2004/0021885 | A1 * | 2/2004 | Nishikawa | 358/1.9 |
| 2005/0219562 | A1 * | 10/2005 | Stevens | 358/1.9 |
| 2006/0279753 | A1 | 12/2006 | Yao et al. | |
| 2007/0139671 | A1 | 6/2007 | Stevens | |
| 2007/0146731 | A1 | 6/2007 | Stevens | |

* cited by examiner

Primary Examiner—King Y Poon
Assistant Examiner—Richard Zhu
(74) Attorney, Agent, or Firm—Fay Sharpe LLP

(57) ABSTRACT

Document processing systems and methods are presented for transforming color image data from an input color space to output color space using space filling interpolation to mitigate loss of color information at the corners of color gamuts. An initial interpolation of the input color space pixel values for each pixel is performed to compute initial output color space pixel values, and these are converted into luminance-chrominance color space pixel values. An adjustment value $\lambda$ is then computed according to the luminance-chrominance color space pixel values, and final output color space pixel values are computed according to the initial output color space pixel values and the adjustment value $\lambda$.

8 Claims, 5 Drawing Sheets

METHOD AND SYSTEM FOR IMPROVED SPACE FILLING INTERPOLATION

BACKGROUND

The present exemplary embodiment relates to document processing systems and more particularly to improved space filling interpolation systems and methods to facilitate retention of the full color gamut. The disclosure finds particular utility in conjunction with one or more color transformations using lookup tables (LUTs) in color printing, scanning, and copying systems and will be described with a particular reference thereto. However, the exemplary techniques and systems of this disclosure may alternatively be employed in other document processing systems and applications in which image color transformations are performed using interpolation. Color image data is often transformed or converted from one color space to another color space, typically using lookup tables (LUTs) that include an array of data values in the target space. For a given input value, an interpolation is done using weighting values for table nodes of a polytope bounding the input value in order to compute the corresponding pixel value in the target color space. Such transformations are employed in document processing systems such as scanner/printer devices, for example, to transform RGB scanned input data to a device-dependent output color space associated with a print engine or other output device. Such transforms may be performed directly from the first device-dependent space to the second device-dependent space, or may involve an intermediate transformation to a device independent color space before converting the data to the output color space. Each such color transformation, however, is subject to loss of color information near the gamut surface of the target space, wherein complex color mapping pipelines that involve two or more color transforms or mappings can have errors that concatenate. These problems are also of greater impact where small LUTs are used. Thus, there is a need for improved color document processing systems and transformation techniques by which the adverse effects of gamut boundary color loss are avoided or mitigated.

BRIEF DESCRIPTION

In the present disclosure, methods and systems are provided for color data transformation using space filling interpolation by which loss of color information at the corners of color gamuts can be avoided or mitigated in document processing systems or other applications in which lookup table interpolation is used in transforming color image data from one color space to another.

Methods are provided in accordance with one or more aspects of the disclosure for transforming color image data from an N-dimensional input color space to an M-dimensional output color space. The methods involve provision of a lookup table (LUT) with table entries having M output color space values for boundary nodes defining (N+1) sided bodies in the output color space, and transformation of input color data. The transform for each input pixel includes an initial interpolation using the lookup table to compute initial output color space pixel values and conversion of the initial output color space pixel values into luminance-chrominance color space pixel values. The initial interpolation may be any type that may be described as a weighted sum of the LUT nodes, such as a tetrahedral interpolation in one embodiment. The pixel transform also includes computing an adjustment value $\lambda$ according to the luminance-chrominance color space pixel values, and computing final output color space pixel values according to the initial output color space pixel values and the adjustment value $\lambda$. The adjustment value $\lambda$ may be computed based on a value $\sigma$, which is determined for each input pixel as having a value of 1 if the chrominance values of the luminance-chrominance color space pixel values are all zero, and otherwise $\sigma$ is determined by computing a saturation value for the luminance-chrominance color space pixel values, and computing a via interpolation of the luminance-chrominance color space pixel values according to saturation values for the luminance-chrominance color space pixel values and for boundary nodes defining an (N+1) sided body corresponding to the current pixel. The adjustment value $\lambda$ is then computed according to the value car. The computation of the adjustment value $\lambda$ in certain embodiments may further comprise computing a blending function $\beta$ according to the saturation value for the boundary nodes defining an (N+1) sided body corresponding to the current pixel, where the adjustment value $\lambda$ is computed according to the value $\sigma$ and the blending function $\beta$.

Further aspects of the disclosure provide a document processing system, including a scanning or rendering component that produces input color image data and a converter that converts the input data from the input space to the output color space. The converter comprises a lookup table including table entries with output color space values for boundary nodes defining bodies in the output color space, as well as an interpolator operative for each pixel of the color image data to perform an initial interpolation of the input color space pixel values using the lookup table entries to compute initial output color space pixel values. The interpolator converts the initial output color space pixel values into luminance-chrominance color space pixel values, computes an adjustment value $\lambda$ according to the luminance-chrominance color space pixel values, and computes final output color space pixel values according to the initial output color space pixel values and the adjustment value $\lambda$.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
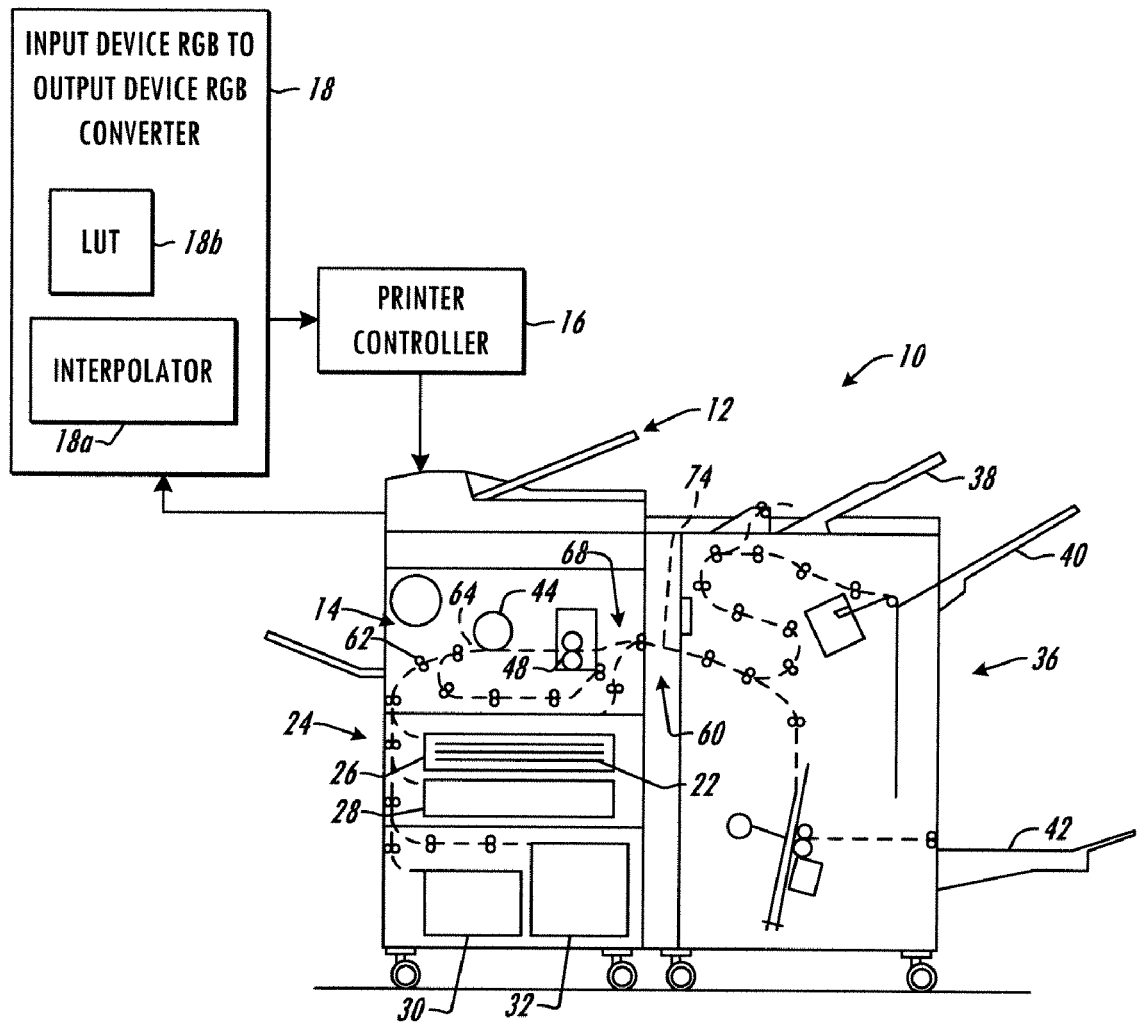
FIG. 1 is a schematic system level diagram illustrating an exemplary document processing system with a scanner and a color converter including a space filling interpolator in accordance with various aspects of the present disclosure.

FIG. 1 illustrates an exemplary document processing or printing system 10 in accordance with one or more aspects of the present disclosure. The printing system 10 can be any form of commercial printing apparatus, copier, printer, facsimile machine, or other system having a scanner or other input device 12 that scans an original document text and/or images to create an image comprising pixel values indicative of the colors and/or brightness of areas of the scanned original, and which preferably includes one or more marking engines or print engines 14 by which visual images, graphics, text, etc. are printed on a page or other printable medium, including xerographic, electro photographic, and other types of printing technology, wherein such components are not specifically illustrated to avoid obscuring the various alternate imaging features of the present disclosure. The print engine 14 may be any device or marking apparatus for applying an image from a printer controller 16 to printable media (print media) such as a physical sheet of paper, plastic, or other suitable physical media substrate for images, whether precut or web fed, where the input device 12, print engine 14, and controller 16 are interconnected by wired and/or wireless links for transfer of electronic data therebetween, including but not limited to telephone lines, computer cables, ISDN lines, etc. The print engine 14 generally includes hardware and software elements employed in the creation of desired images by electrophotographic processes wherein suitable print engines may also include ink-jet printers, such as solid ink printers, thermal head printers that are used in conjunction with heat sensitive paper, and other devices capable of printing an image on a printable media.

The image input device 12 may include or be operatively coupled with conversion components for converting the image-bearing documents to image signals or pixels or such function may be assumed by the marking engine 14. In the illustrated embodiment, for example, the system 10 includes an analyzer component 18, which can be any suitable hardware, software, logic, or combinations thereof, whether implemented as a single component or as multiple interoperative components operatively interfaced with the image input device 12, which is comprised in the illustrated embodiment of an RGB-to-RGB converter 18 that includes a lookup table (LUT) 18b and an interpolator 18a, which can be constructed as programs, files, logic, or combinations thereof, whether unitary or distributed in any suitable fashion to implement the color data conversion and interpolation functionality described herein, where the converter 18 includes or is operatively coupled with memory of the document processing system 10 for storage of input, output, and intermediate data and results of the computations and data manipulations illustrated and described hereinafter. The document processing system 10 further includes a printer controller operatively associated with the converter 18 for controlling operation of the output devices such as print engine(s) of the system 10.

In one exemplary mode of operation, the converter 18 may be advantageously employed to receive input image pixel data from the scanner input device 12 in a device-dependent first or input color space (e.g., RGB in the illustrated example). In this example, the converter LUT 18b is provisioned with data values in a device-dependent second or output color space (e.g., also RGB in this example) for a plurality of vertices or nodes that define bodies for use by the interpolator 18a in transforming the input pixel data values to output-space data values. Moreover, in this implementation, the output space is associated with a print engine or other output device, whereby the converted color pixel data are employed by the printer controller 16 to generate an output color printed image, for instance, using a print engine of the system 10. Thus, the converter 18 finds particular utility in system operation for scanning an original document and printing a copy.

In this mode of operation, the image input device 12 is used to scan an original document to form red-green-blue (RGB) values for each pixel in an array of pixel data, and the RGB to RGB converter component 18 converts the input RGB data of the input color space associated with the scanner 12 into output RGB pixel data of the output color space associated with the print engine, wherein the pixel data in both these spaces is three dimensional including a red (r) value, a green value (g), and a blue value (b) for each pixel of both the scanned and printed images. As described further below, the exemplary converter 18 employs a space filling interpolator 18a that implements an initial interpolation to convert the input data to output space data, with an intermediate conversion of this data to a Luminance-Chrominance (L-C) space data including a luminance value I, and two chrominance values $c_r$ and $c_g$. The converter 18 employs this L-C data in computing an adjustment value that is used in computing the final output color data that is used to print the copy, where the exemplary conversion provides for space filling to reduce or mitigate undesired color loss at the corners of the color gamut. In this manner, the full gamut of the output device can be exploited for improved input/output performance of the document processing system 10. The input data from the scanner 12 and the output data from the converter 18 are stored in memory associated with the system 10, as are intermediate results values, the data associated with the LUT 18b, and other variables and data as described herein.

In the illustrated document processor 10, the printer controller 16 provides the output pixel data from memory to a print engine 14 that is fed with a print media sheets 22 from a feeding source 24 such as a paper feeder which can have one or more print media sources or paper trays 26, 28, 30, 32, each storing sheets of the same or different types of print media 22 on which the marking engine 14 can print. The exemplary print engine 14 includes an imaging component 44 and an associated fuser 48, which may be of any suitable form or type, and may include further components which are omitted from the figure so as not to obscure the various aspects of the present disclosure. For instance, the printing engine 14 may include a photoconductive insulating member which is charged to a uniform potential and exposed to a light image of an original document to be reproduced. The exposure discharges the photoconductive insulating surface in exposed or background areas and creates an electrostatic latent image on the member corresponding to image areas of the original document. The electrostatic latent image on the photoconductive insulating surface is made visible by developing the image with an imaging material such as a developing powder comprising toner particles, which is then transferred to the print media and permanently affixed in the fusing process.

In a multicolor electrophotographic process, successive latent images corresponding to different colors can be formed on the insulating member and developed with a respective toner of a complementary color, with each color toner image being successively transferred to the paper sheet in superimposed registration with the prior toner image to create a multi-layered toner image on the printed media 22, and where the superimposed images may be fused contemporaneously, in a single fusing process. The fuser 48 receives the imaged print media from the image-forming component and fixes the toner image transferred to the surface of the print media 22, where the fuser 48 can be of any suitable type, and may include fusers which apply heat or both heat and pressure to an image. Printed media from the printing engine 14 is delivered to a finisher 36 including one or more finishing output destinations 38, 40, 42 such as trays, stackers, pans, etc.

The document processing system 10 is operative to perform these scanning and printing tasks in the execution of print jobs, which can include printing selected text, line graphics, images, machine ink character recognition (MICR) notation, etc., on either or both of the front and back sides or pages of one or more media sheets 22. An original document or image or print job or jobs can be supplied to the printing system 10 in various ways. In one example, the built-in optical scanner 12 may be used to scan a document such as book pages, a stack of printed pages, or so forth, to create a digital image of the scanned document that is reproduced by printing operations performed by the printing system 10 via the data transform functionality as described herein. Alternatively, the print jobs can be electronically delivered to the system controller 16 via a network or other means, for instance, whereby a network user can print a document from word processing software running on a network computer, thereby generating an input print job, wherein the conversion techniques described herein can be used in any operation requiring conversion of color image data from a first color space to a second color space, and where either or both of the input and output spaces can be device-dependent or device-independent spaces within the scope of the present disclosure.

A print media transporting system or network or highway 60 of the document processing system 10 links the print media source 24, the print or marking engine 14 and a finisher 36 via a network of flexible automatically feeding and collecting drive members, such as pairs of rollers 62, spherical nips, air jets, or the like, along with various motors for the drive members, belts, guide rods, frames, etc. (not shown), which, in combination with the drive members, serve to convey the print media along selected pathways at selected speeds. In the illustrated embodiments, print media 22 is delivered from the source 24 to the print engine 14 via a pathway 64 common to the input trays 26, 28, 30, 32, and is printed by the imaging component 44 and fused by the fuser 48, with a pathway 68 from the printer 14 merging into a pathway 74 which conveys the printed media to the finisher 36, where the pathways 64, 68, 74 of the network 60 may include inverters, reverters, interposers, bypass pathways, and the like as known in the art. In addition, the print engine 14 may be configured for duplex or simplex printing and a single sheet of paper 22 may be marked by two or more print engines 14 or may be marked a plurality of times by the same marking engine 14, for instance, using internal duplex pathways.

Figure 2:
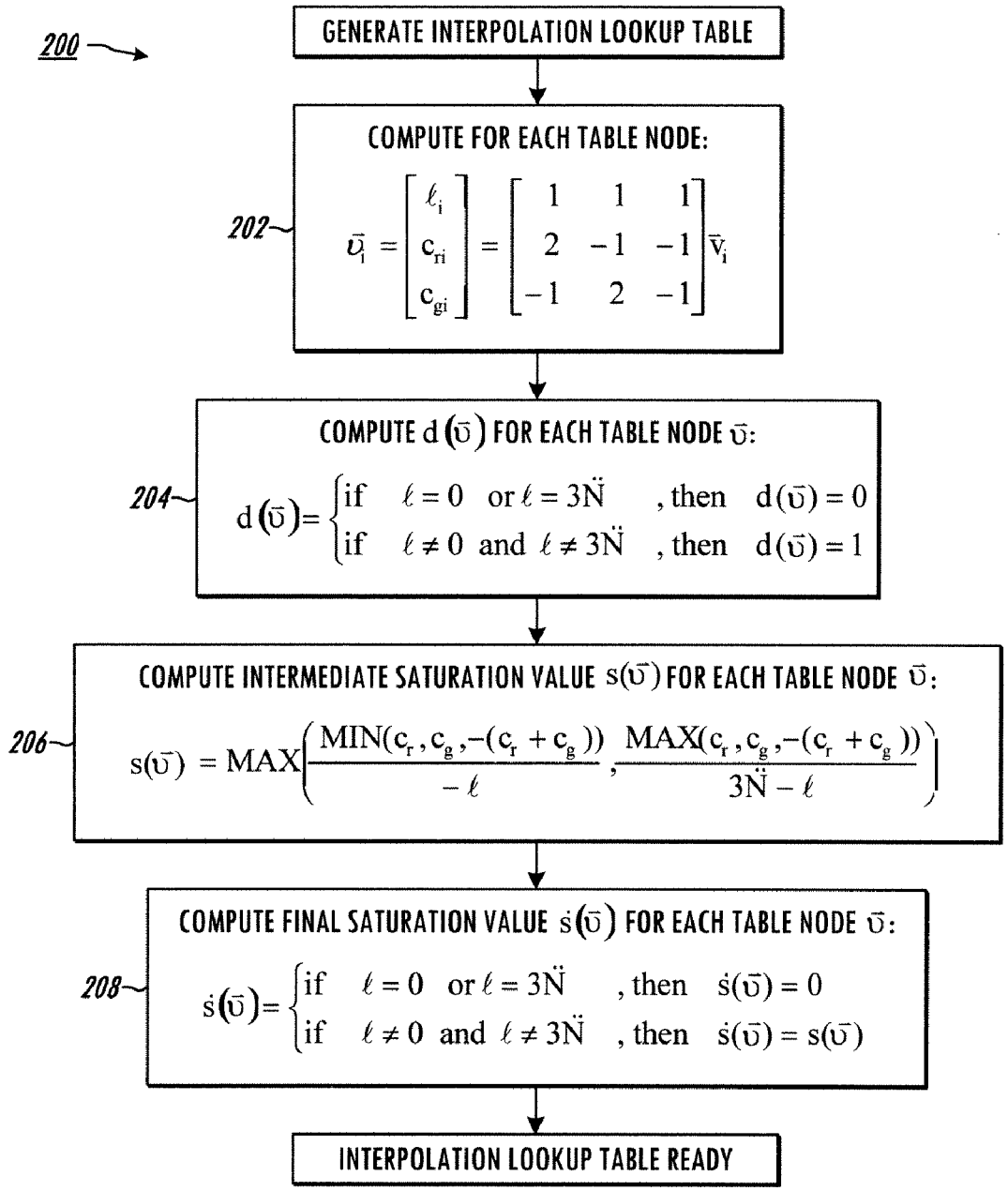
FIG. 2 is a flow diagram illustrating exemplary pre-processing for computing various saturation values for node data in a lookup table of the color converter.
Figure 3A:
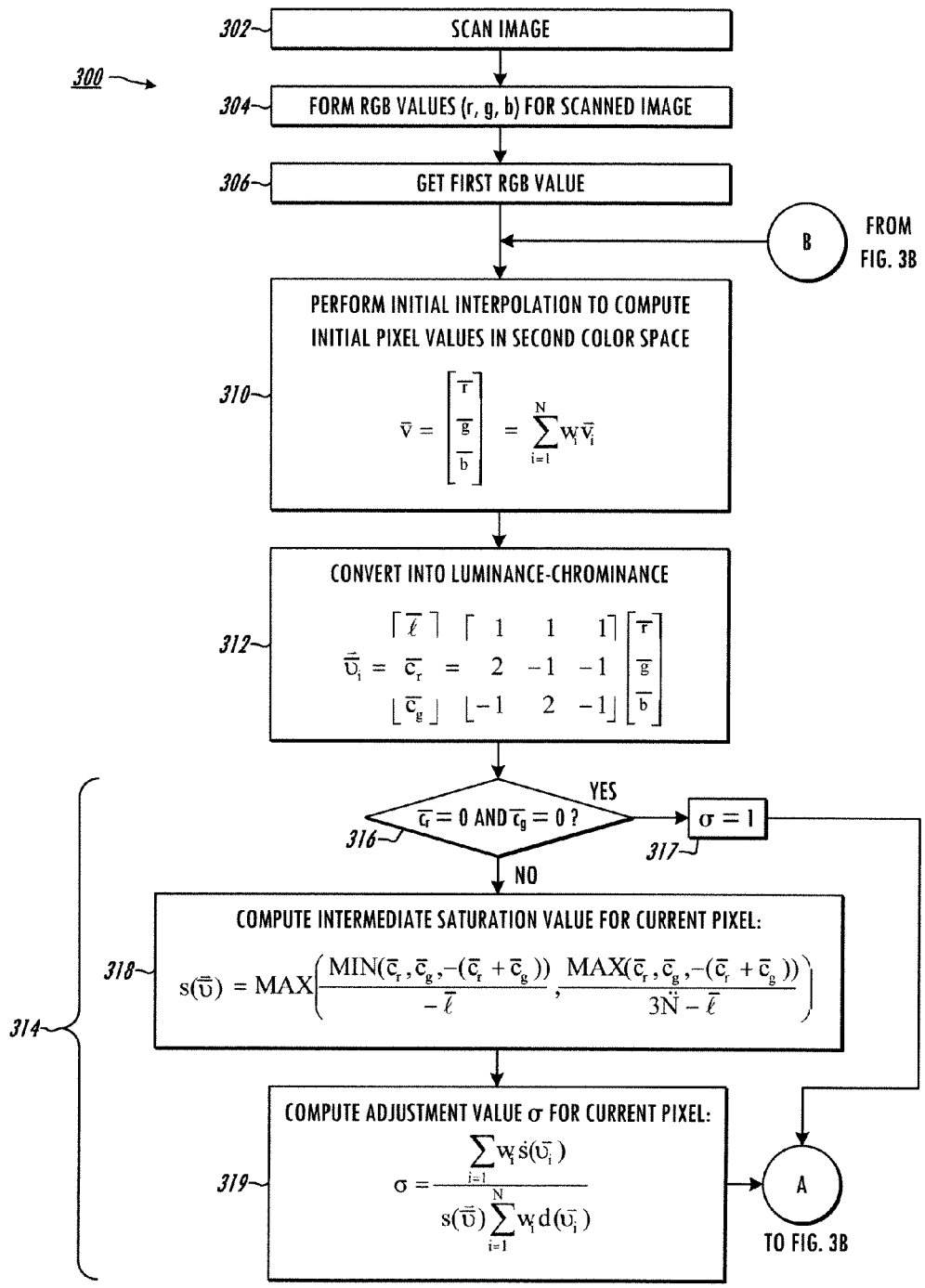
FIGS. 3A and 3B depict a flow diagram illustrating exemplary space filling interpolation process in accordance with one or more aspects of the present disclosure.
Figure 3B:
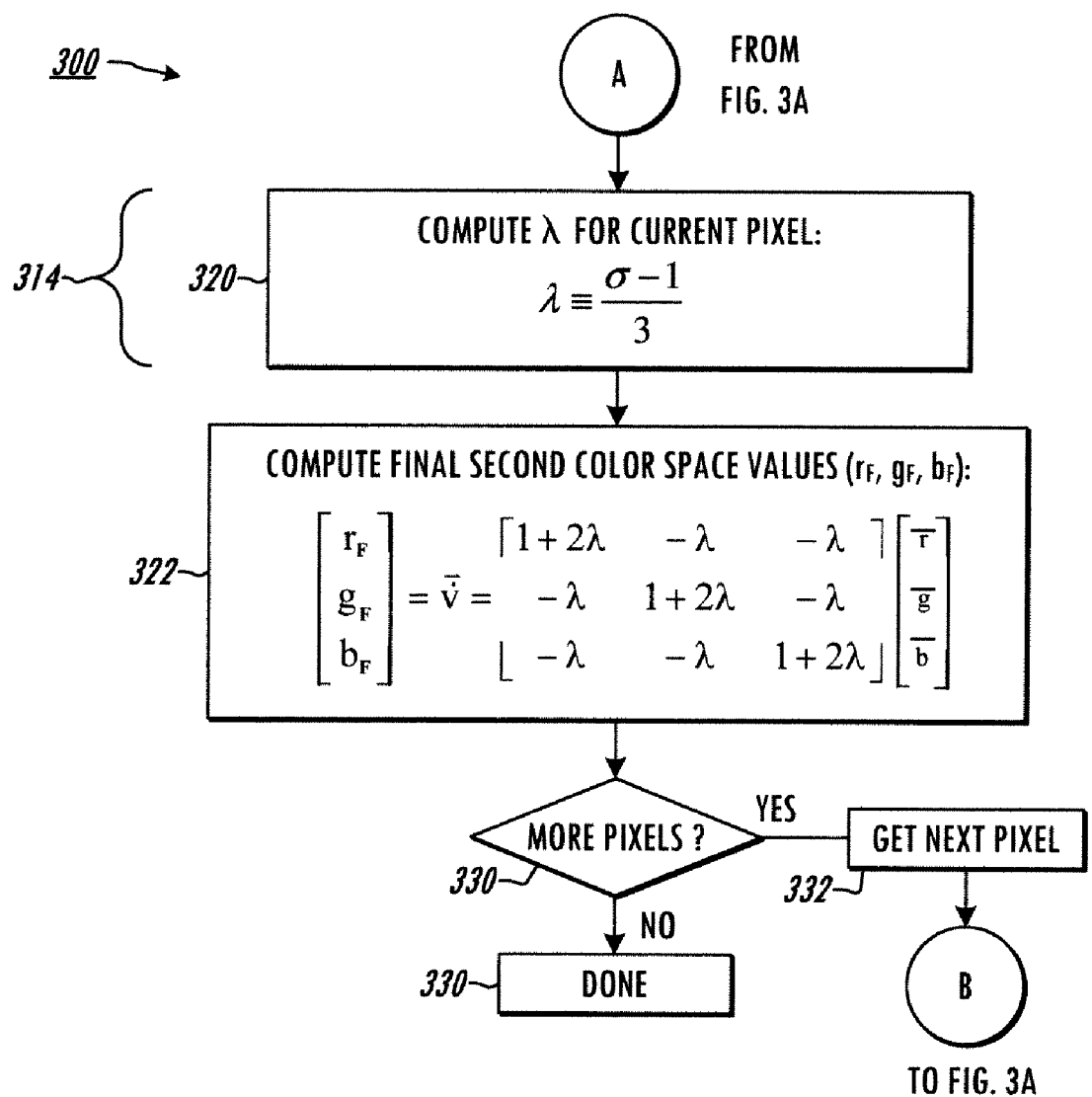
Figure 4:
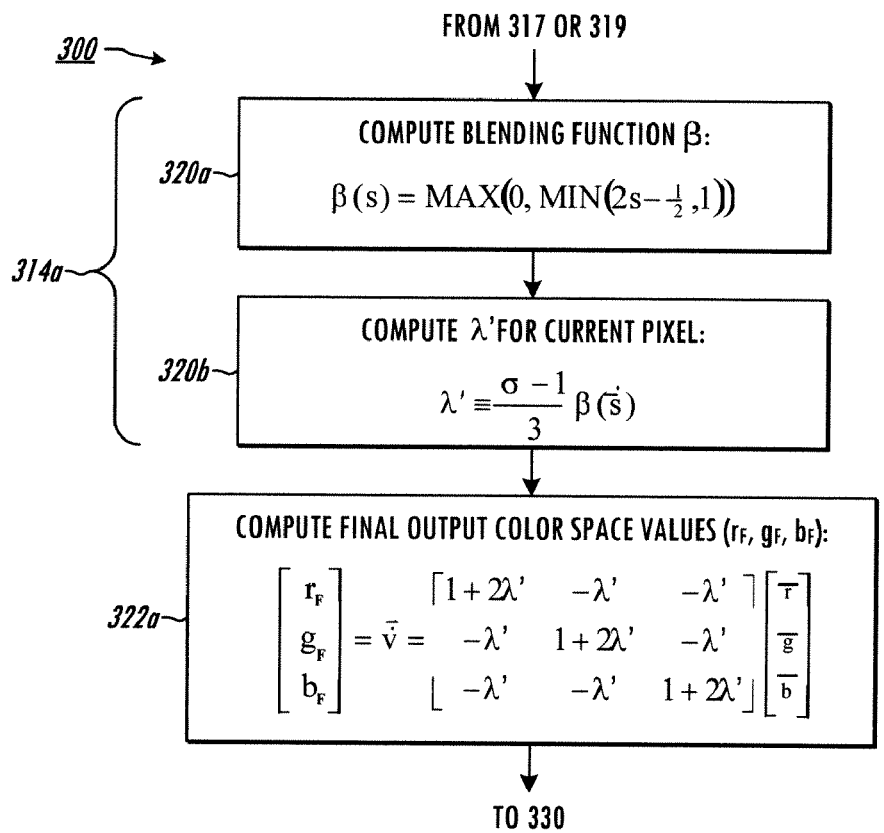
FIG. 4 is a flow diagram illustrating an alternate implementation of the process of FIGS. 3A and 3B in which a blending function is computed in performing the space filling interpolation.

Referring also to FIGS. 2-4, in accordance with various aspects of the present disclosure, the document processing system 10 includes an improved converter component 18 for color data transformation or conversion that uses space filling interpolation to avoid or mitigate data loss near gamut surfaces. FIG. 2 illustrates a flow diagram 200 showing the provisioning of the converter 18 with exemplary LUT data including pre-processing for computing various saturation values for node data in the table 18b, FIGS. 3A and 3B depict an exemplary method 300 for space filling interpolation processing to transform color image data from a 3-dimensional input color space to a 3-dimensional output color space in accordance with one or more aspects of the present disclosure, and FIG. 4 illustrates an alternate implementation in which a blending function is computed in performing the space filling interpolation. Although the exemplary methods 200, 300 are illustrated and described hereinafter in the form of a series of acts or events, it will be appreciated that the various methods in the claims below are not limited by the illustrated ordering of such acts or events except as specifically set forth therein. In this regard, except as specifically provided in the claims, some acts or events may occur in different order and/or concurrently with other acts or events apart from those acts and ordering illustrated and described herein, and not all illustrated steps may be required to implement a process or method in accordance with the present disclosure. The methods, moreover, may be implemented in hardware, software, or combinations thereof, in order to provide the described functionality, wherein these methods can be practiced in hardware and/or software of the above described systems or other hardware and/or software operatively associated with a printing system, wherein the disclosure is not limited to the specific applications and implementations illustrated and described herein.

FIG. 2 shows exemplary pre-processing 200 of the LUT data to compute saturation values for each node or vertex of the LUT 18b, beginning with the table 18b populated with table entries with 3 output color space values (r, g, and b) for boundary nodes defining 4 sided bodies in the output color space associated with the print engine 14. In this regard, the ranges N" for the r, g, and b values can be any number, such as 255 in which the r, g, and b values are integers for an 8-bit data example, or N"=1 in another possible example with r, g, and b being real numbers less than or equal to 1. At 202 in FIG. 2, luminance-chrominance data values l, $c_r$, and $c_g$ are computed for each table node. In this example, it is noted that the 3-dimensional L-C space in 202 is representative of a more general 4-dimensional L-C color space having values l, $c_r$, $c_b$, and $c_g$ as this 4-dimensional space is derived from the 3 dimensional rgb space and one of its axes thereof is redundant with each of the $c_r$, $c_b$, and $c_g$ being linear combinations of the others. As a result, any of the $c_r$, $c_b$, and $c_g$ axes may be eliminated, and in the illustrated examples and description, the $c_b$ axis has been eliminated (since if the value of $c_b$ is needed, it can be calculated from $c_r$ and $c_g$), where l ranges from 0 to 3N", with $c_r$ and $c_g$ each ranging from −2N" to +2N".

At 204, a function "d" is computed for each 3-dimensional L-C space node data based on the luminance value l, where d is set to zero if the luminance l is at one of the boundaries (if l=0 or l=3N"), and otherwise d is set to one. This value "d" for each table node may be stored in memory of the system 10, and can optionally be incorporated into the LUT 18b itself as an additional value associated with the node data. In addition, the exemplary pre-processing 200 includes computation of intermediate and final color saturation values S and S' at 206 and 208, which are also saved in system memory and which may likewise be incorporated as further node values in the table 18b. At 206, an intermediate saturation value S(l, $c_r$, and $c_g$) is computed for each table node, where the value of S in this example ranges from zero to one, where the computed S values are stored in the memory of the system 10, and can be included in the LUT 18b. To account for singularities at the extreme ends of the luminance axis, a final color saturation value S' is determined for each table node at 208, where S'(l, $c_r$, and $c_g$) is set to zero for the extremes (for l=0 or l=3N"), and otherwise is set to the intermediate saturation value S(l, $c_r$, and $c_g$). The final saturation values S' are saved in memory, and may likewise be stored in the LUT 18b, wherein the intermediate value may be discarded in certain implementations, whereafter the LUP 18b is then ready for use in color data transformation.

Referring now to FIGS. 3A and 3B, a method 300 is illustrated for transforming color image data from an N-dimensional input color space to an N-dimensional output color space. At 302 in one example, an image is scanned (e.g., using the scanner input device 12 in FIG. 1), and the corresponding r, g, and b values are formed at 304 for each pixel of the scanned image. The method 300 then provides for converting or transforming each pixel from the input RGB space to an output RGB space, for example, that associated with the print engine 14 in the system 10 of FIG. 1. The processing of the r, g, and b values for the first pixel begins at 306, and an initial interpolation is performed at 310 of the input color space pixel values using the lookup table entries to compute initial output color space pixel values. In this example, a tetrahedral interpolation is used at 310, where the input color space values determine the location in a particular body of the LUT 18*b*, with the corresponding weighting factors W and bounding node values are used to compute the initial output color space pixel values. The initial output color space pixel values are converted at 312 into L-C color space pixel values, and then an adjustment value $\lambda$ is computed at 314 in FIGS. 3A and 3B according to the L-C color space pixel values. Thereafter at 322 (FIG. 3B), the final output color space pixel values are computed for the current pixel according to the initial output color space pixel values and according to the adjustment value $\lambda$, and the process 300 is repeated for the next pixel at 330 and 332 until all the input pixels have been transformed to complete the process 300 at 330.

In the embodiment of FIGS. 3A and 3B, the adjustment value $\lambda$ is computed at 314 at least partially according to chrominance values $c_r$, and $c_g$ of the L-C color space pixel values using a value $\sigma$. $\sigma$ is a function of a saturation function S, and includes singularities that do not evaluate. However, $\sigma$ is specific to a particular N-body that is being interpolated, wherein the particular N-body provides context to the computation since the interpolation approaches a singularity from specific direction. When this happens, the limit of the saturation function is well defined, and may be evaluated. A determination is made at 316 as to whether the chrominance values $c_r$, and $c_g$ are both zero. If so (YES at 316), $\sigma$ is set to one at 317 and the method 300 proceeds to 320 in FIG. 3B. Otherwise (NO at 316 in FIG. 3A), an intermediate saturation value $S(l, c_r,$ and $c_g)$ is computed at 318 for the L-C data of the current pixel. Thereafter at 319, $\sigma$ is computed by interpolating the luminance-chrominance color space pixel values according to saturation values for the luminance-chrominance color space pixel values and boundary nodes, and the adjustment value $\lambda$ is computed at 320 (FIG. 3B) according to the value $\sigma$, where the $\sigma$ computation at 319 in this embodiment employs the previously computed and stored final saturation values S' as well as the "d" values for the bounding table nodes, and also uses the intermediate pixel saturation value S computed at 318.

Referring also to FIG. 4, another aspect of the disclosure involves computing a blending function $\beta$ according to the boundary node saturation value S as part of the computation of a different adjustment value $\lambda'$ at 314*a*. This may advantageously force tetrahedral interpolation near the gray and space filling interpolation near the gamut surface. In this example (continuing from 317 or 319 in FIG. 3A above), the blending function $\beta'$ is computed at 320*a* in FIG. 4 for the current pixel, and the adjustment value $\lambda'$ is computed at 320*b* according to the value $\sigma$ and according to the blending function $\beta$. Thereafter, the final output color space values ($r_F$, $g_F$, and $b_F$ in this example) are computed at 322*a* according to the adjustment value $\lambda'$.

Figure 5:
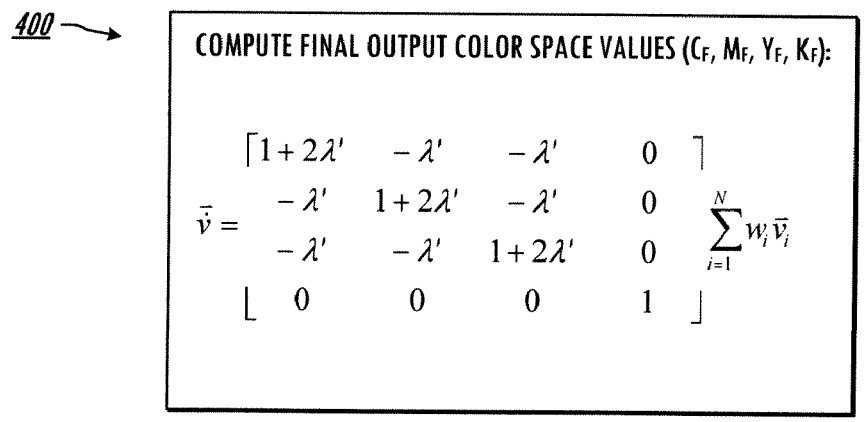
FIG. 5 illustrates another exemplary interpolation for a four-dimensional color space in accordance with the present disclosure.

Referring also to FIG. 5, it is noted that interpolation techniques illustrated and described herein can be employed in transforming color data between any first and second color spaces. FIG. 5 illustrates another exemplary interpolation 400 for a four-dimensional color space (e.g., CMYK) in accordance with the present disclosure, and other interpolations can be constructed for transformation in association with any color space. When dealing with additional chromatic primaries (such as hexachrome), for example, additional terms can be similarly provided along the matrix diagonal, such that matrices may be derived for other color systems as needed within the scope of the present disclosure.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. A method of transforming color image data from an N-dimensional input color space to an M-dimensional output color space, the method comprising:
providing a lookup table comprising table entries with M output color space values for performing an initial interpolation that takes the form of a weighted sum of the lookup table entries;
for each N-dimensional pixel of the color image data having N input color space pixel values:
performing an initial interpolation of the input color space pixel values using the lookup table entries to compute M initial output color space pixel values;
converting the initial output color space pixel values into luminance-chrominance color space pixel values;
using a processor, computing an adjustment value $\lambda$ according to the luminance-chrominance color space pixel values at least partially according to chrominance values of the luminance-chrominance color space pixel values,
wherein computing the adjustment value $\lambda$ comprises:
if the chrominance values of the luminance-chrominance color space pixel values are all zero, setting a value $\sigma$ to 1,
if the chrominance values of the luminance-chrominance color space pixel values are not all zero:
computing a saturation value for the luminance-chrominance color space pixel values, and
computing the value $\sigma$ by interpolating the luminance-chrominance color space pixel values according to saturation values for the luminance-chrominance color space pixel values and for boundary nodes defining an (N+1) sided body corresponding to the current pixel, and computing the adjustment value λ according to the value σ; and computing final output color space pixel values according to the initial output color space pixel values and the adjustment value λ.

2. The method of claim 1, wherein the initial interpolation is a tetrahedral interpolation.

3. The method of claim 2, wherein computing the adjustment value λ further comprises computing a blending function β according to a saturation value for boundary nodes defining an (N+1) sided body corresponding to the current pixel, and wherein the adjustment value λ is computed at least partially according to the blending function β.

4. The method of claim 1, wherein computing the adjustment value λ further comprises computing a blending function β according to a saturation value for boundary nodes defining an (N+1) sided body corresponding to the current pixel, and wherein the adjustment value λ is computed at least partially according to the blending function β.

5. A document processing system, comprising:

a scanning or rendering component operative to produce input color image data from an N-dimensional input color space representing an original image; and a converter operative to receive the input color image data and operative to convert the input color image data from the input color space to an M-dimensional output color space, the converter comprising:

a lookup table comprising table entries with M output color space values to be used in conjunction with an initial interpolation that takes the form of a weighted sum of the lookup table entries; and an interpolator operative for each N-dimensional pixel of the color image data having N input color space pixel values to perform an initial interpolation of the input color space pixel values using the lookup table entries to compute initial output color space pixel values, to convert the initial output color space pixel values into luminance-chrominance color space pixel values, to compute an adjustment value λ according to the luminance-chrominance color space pixel values, and to compute final output color space pixel values according to the initial output color space pixel values and the adjustment value λ;

wherein the interpolator computes the adjustment value λ at least partially according to chrominance values of the luminance-chrominance color space pixel values; and wherein the interpolator is operative to set a value σ to 1 if the chrominance values of the luminance-chrominance color space pixel values are all zero and otherwise to compute a saturation value for the luminance-chrominance color space pixel values and compute the value σ by interpolating the luminance-chrominance color space pixel values according to saturation values for the luminance-chrominance color space pixel values and for boundary nodes defining an (N+1) sided body corresponding to the current pixel; and wherein the interpolator computes the adjustment value λ according to the value σ.

6. The document processing system of claim 5, wherein the interpolator performs the initial interpolation as a tetrahedral interpolation.

7. The document processing system of claim 6, wherein the interpolator computes a blending function β according to a saturation value for boundary nodes defining an (N+1) sided body corresponding to the current pixel, and computes the adjustment value λ at least partially according to the blending function β.

8. The document processing system of claim 5, wherein the interpolator computes a blending function β according to a saturation value for boundary nodes defining an (N+1) sided body corresponding to the current pixel, and computes the adjustment value λ at least partially according to the blending function β.

* * * * *